(12) United States Patent
Tarnopolsky

(10) Patent No.: US 6,363,804 B1
(45) Date of Patent: Apr. 2, 2002

(54) SYSTEM AND METHOD FOR CONVERSION OF GRAVITY INTO MECHANICAL ENERGY USING TWO SUB-SYSTEMS

(76) Inventor: Mikhail Tarnopolsky, 7110 Ridge Ct., Brooklyn, NY (US) 11209

( * ) Notice: Subject to any disclaimer, the term of this patent is extended or adjusted under 35 U.S.C. 154(b) by 0 days.

(21) Appl. No.: 09/292,231

(22) Filed: Mar. 30, 1999

Related U.S. Application Data

(63) Continuation-in-part of application No. 09/085,401, filed on May 26, 1998, now abandoned.

(51) Int. Cl.[7] ................................................ F03G 3/00
(52) U.S. Cl. ................................. 74/64; 185/27; 74/63; 74/DIG. 9
(58) Field of Search ........................ 74/64, 63, DIG. 3; 185/27

(56) References Cited

U.S. PATENT DOCUMENTS

| 1,767,311 A | * | 6/1930 | Rohrbacher | 185/27 |
| 1,791,386 A | * | 2/1931 | Sprigg et al. | 74/64 |
| 5,024,637 A | * | 6/1991 | Guichard | 475/166 |
| 5,667,038 A | * | 9/1997 | Tarnopolsky | 185/27 |

* cited by examiner

*Primary Examiner*—Burton S. Mullins
(74) *Attorney, Agent, or Firm*—Steven Horowitz

(57) ABSTRACT

Two similar gravitational transducer sub-systems connected with one another to maintain rotational energy caused by gravity as a result of the interaction between the two sub-systems. Each of the two sub-systems viewed independently employs a method and system of converting gravity into mechanical energy by means of a sequence of impulses of force. Together the overall system achieves enhanced effectiveness and achieves substantially constant velocity for certain periods of duration.

7 Claims, 3 Drawing Sheets

SYSTEM AND METHOD FOR CONVERSION OF GRAVITY INTO MECHANICAL ENERGY USING TWO SUB-SYSTEMS

The present invention is a continuation-in-part application based on the continuation-in-part patent application having Ser. No. 09/085,401 filed on May 26, 1998 now abandoned.

The present invention utilizes the interaction between two freely rotating sub-systems, each of which taken alone converts gravitational energy into mechanical energy using the method and system described in U.S. Pat. No. 5,921,133 for a System and Method of Conversion of Gravitation by Means of Sequence of Impulses of Force and the present invention incorporates this patent by reference.

SUMMARY OF THE INVENTION

Accordingly, it is an objective to provide a new way for a 'System and Method of a maintained free rotation by means of interaction between two similar gravitational transducer sub-systems'.

The word "transducer" used herein simply means a device.

In keeping with this way and with others, which will become apparent hereinafter, another feature of the present invention resides, briefly stated, in a system and method of a maintained free rotation by means of the interaction between two similar gravitational transducer sub-systems, which each have the first rotatable unbalanced element and the second rotatable unbalanced element.

Applicant has named the machine that uses the system of the present invention "Galla".

With respect to the first sub-system, the first (rotatable) element and the second (rotatable) element are connected to one another by means of gears spaced equidistantly on a periphery of the second element and a first overrunning clutch, having a first local unbalanced mass on each gear, said first local unbalanced mass having an axle attached therethrough and connected to each gear by means of a second overrunning clutch.

The first element has a certain kinematic relation to the second element such that during a free rotation of the first and second elements from an initial position, the first element is powered by the first unbalanced mass, by the second unbalanced mass and by sequential impulses of force that are generated as a result of the constant rotational separation of the second unbalanced mass from the first unbalanced mass.

Said sequential impulses of force cause said first rotatable element to rotate with increasing speed during approximately two-thirds of a rotational cycle of said rotatable element and with decreasing speed during approximately one third of the rotational cycle of said first rotatable element.

The second element is powered by the second unbalanced mass, by the first unbalanced mass, by sequential impulses of force that are generated as a result of a rotation of the first local unbalanced masses around their respective axles and as a result of the constant rotational separation of the second unbalanced mass from the first unbalanced mass, and by means of the gears in the first sub-system.

The second rotatable element rotates slower than the first element due to the reacting force of the increased speed of the first rotatable element.

With respect to the second sub-system, there is a third unbalanced mass on a third rotatable element of a second sub-system, and there is a fourth unbalanced mass on a fourth rotatable element of a second sub-system. Gears, spaced equidistantly on a periphery of the fourth element and a third overrunning clutch, connect the third element and the fourth element to one another. A second local unbalanced mass is placed on each gear of the second sub-system, said second local unbalanced mass having an axle attached therethrough and connected to each gear by means of a fourth overrunning clutch. By means of calculation, the certain kinematic relation between the third element and the fourth element is such that during a free rotation of the third and fourth elements from an initial position, the third element is powered by the third unbalanced mass, by the fourth unbalanced mass, and by sequential impulses of force that are generated as a result of a rotation of the second local unbalanced masses around their respective axles and as a result of the constant rotational separation of the fourth unbalanced mass from the third unbalanced mass. These sequential impulses of force cause the third rotatable element to rotate with increasing speed during approximately two-thirds of a rotational cycle of said third rotatable element and with decreasing speed during approximately one third of the rotational cycle of said third rotatable element.

The third and fourth elements are rotated so that the fourth element is powered by the fourth unbalanced mass, by the third unbalanced mass, by sequential impulses of force that are generated as a result of a rotation of the second local unbalanced masses around their respective axles and as a result of the constant rotational separation of the fourth unbalanced mass from the third unbalanced mass, and by means of the gears in the second sub-system when the second sub-system is not connected to the first sub-system, and so that the fourth element rotates slower than the third element due to the reacting force of the increased speed of the third element.

The first element of the first sub-system and the third element of the second sub-system are connected by means of a fifth overrunning clutch that provides sufficient friction between the first and third elements so that movement of the first element causes the third element to move when the second sub-system is released from an initial position.

The second sub-system begins to operate and interact with the first sub-system after a duration of one-third of the rotational cycle of the first rotational element. That one-third of the rotational cycle of the first rotational element occurs with increasing velocity. In our case, there are six revolutions in a cycle and one-third refers to after the first two revolutions.

The first rotatable element of the first sub-system and the third rotatable element of the second sub-system are connected to each other by fifth overrunning clutch that provides sufficient friction so that the movement of the first rotatable element makes the third rotatable element move when the second sub-system is released from an initial position. The fifth overrunning clutch provides sufficient friction through well known means such as the adjustment of its spring. The first and third rotatable elements are each able to make two-thirds of a revolution of a cycle with increasing speed with their sub-systems, under such conditions.

The first and second sub-systems are connected to one another with their first elements by means of the fifth overrunning clutch as a provider of a certain friction interaction between them, have first and second overrunning clutches themselves, so that the second sub-system starts to work after the first one has already made two revolutions with increasing speed, so that as a result of such friction interaction with a different speeds, it provides increasing speed during the first too revolutions and then maintains it during the third one and increases again during the $4^{th}$ one and then maintains it during the $5^{th}$, $6^{th}$, $7^{th}$ and $8^{th}$ revolution and then decreases slightly during the $9^{th}$ revolution and increases again during the $10^{th}$ one and maintains it during the $11^{th}$, $12^{th}$, $13^{th}$, $14^{th}$ revolutions and then decreases slightly during the $15^{th}$ one so that the next ten combined cycles of rotation maintain what is occurring during the above first two combined cycles.

In this case a system cycle refers to six revolutions beginning when the two sub-systems operate together - from the third revolution through the eighth revolution. The speed (velocity) of the system stays substantially constant during the third revolution, increases during the fourth revolution, stays constant during the fifth, sixth, seventh and eighth revolutions. During the second system cycle, which refers to the ninth through fourteenth revolutions, the system velocity decreases slightly during the ninth revolution, increases during the tenth revolution, stays substantially constant during the eleventh, twelfth, thirteenth and fourteenth revolutions, and during the third system cycle, which refers to the fifteenth through twentieth revolutions, the system decreases slightly during the fifteenth revolution.

The present invention also describes a method of enhanced conversion of gravitation into mechanical energy by means of the interaction of two sub-systems each of which converts gravity into mechanical energy using a sequence of impulses of force as described in U.S. Pat. No. 5,921,133, comprising the steps of:

placing a first unbalanced mass on a first rotatable element of a first sub-system, placing a second unbalanced mass on a second rotatable element of a first sub-system, connecting the first element and the second element to one another by means of a first overrunning clutch and gears spaced equidistantly on a periphery of the second element of the first sub-system, placing a first local unbalanced mass on each gear of the first sub-system, said first local unbalanced mass having an axle attached therethrough and connected to each gear in the first sub-system by means of a second overrunning clutch, calculating a certain kinematic relation between the first element and the second element such that during a free rotation of the first and second element from an initial position, the first element is powered by the first unbalanced mass, by the second unbalanced mass, and by sequential impulses of force that are generated as a result of a rotation of the first local unbalanced masses around their respective axles in the first sub-system and as a result of the constant rotational separation of the second unbalanced mass from the first first unbalanced mass, said sequential impulses of force causing said first rotatable element to rotate with increasing speed during approximately two-thirds of a rotational cycle of said first rotatable element and with decreasing speed during approximately one third of the rotational cycle of said first rotatable element, rotating the first and second elements so that the second element is powered by the second unbalanced mass, by the first unbalanced mass, by sequential impulses of force that are generated as a result of a rotation of the first local unbalanced masses around their respective axles in the first sub-system and as a result of the constant rotational separation of the second unbalanced mass from the first unbalanced mass, and by means of the gears in the first sub-system, when the first sub-system is not connected to the second sub-system, and so that the second element rotates slower than the first element due to the reacting force of the increased speed of the first element, placing a third unbalanced mass on a third rotatable element of a second sub-system, placing a fourth unbalanced mass on a fourth rotatable element of a second sub-system, connecting the third element and the fourth element to one another by means of a third overrunning clutch and gears spaced equidistantly on a periphery of the fourth element, placing a local unbalanced mass on each gear of the second sub-system, said local unbalanced mass having an axle attached therethrough and connected to each gear in the second sub-system by means of a fourth overrunning clutch, calculating a certain kinematic relation between the third element and the fourth element such that during a free rotation of the third and fourth elements from an initial position, the third element is powered by the third unbalanced mass, by the fourth unbalanced mass, and by sequential impulses of force that are generated as a result of a rotation of the local unbalanced masses in the second sub-system around their respective axles and as a result of the constant rotational separation of the fourth unbalanced mass from the third unbalanced mass, said sequential impulses of force causing said third rotatable element to rotate with increasing speed during approximately two-thirds of a rotational cycle of said third rotatable element and with decreasing speed during approximately one third of the rotational cycle of said third rotatable element, rotating the third and fourth elements so that the fourth element is powered by the fourth unbalanced mass, by the third unbalanced mass, by sequential impulses of force that are generated as a result of a rotation of the second local unbalanced masses around their respective axles and as a result of the constant rotational separation of the fourth unbalanced mass from the third unbalanced mass, and by means of the gears in the second sub-system when the second sub-system is not connected to the first sub-system, and so that the fourth element rotates slower than the third element due to the reacting force of the increased speed of the third element, connecting the first element of the first sub-system and the third element of the second sub-system by means of a fifth overrunning clutch that provides sufficient friction between the first and third elements so that movement of the first element causes the third element to move when the second sub-system is released from an initial position, starting the second sub-system to operate and interact with the first sub-system after a duration of one-third of the rotational cycle of the first rotational element (that one-third of the rotational cycle occurs with increasing velocity). In our case, after the first and second sub-systems are connected so there is a friction relation between them, the second sub-system starts to work after the first sub-system has already made two revolutions (which is one-third of a rotational cycle) with increasing speed, so that as a result of such friction interaction with a different speeds, it provides increasing speed during the first two revolutions and then maintains it during the third one and increases again during the $4^{th}$ one and then maintains it during the $5^{th}$, $6^{th}$, $7^{th}$ and $8^{th}$ revolution and then decreases slightly during the $9^{th}$ revolution and increases again during the $10^{th}$ one and maintains it during the $11^{th}$, $12^{th}$, $13^{th}$, $14^{th}$ revolutions and then decreases slightly during the $15^{th}$ one so that the next ten combined cycle of rotations maintain what occurs during the above first two cycles, as seen in FIG. 3.

The invention itself, however, both as to its construction and to its manner of operation, will best be understood from the following description of a preferred embodiment, which is accompanied by the following drawings.

DESCRIPTION OF THE PREFERRED EMBODIMENT

Figure 1:
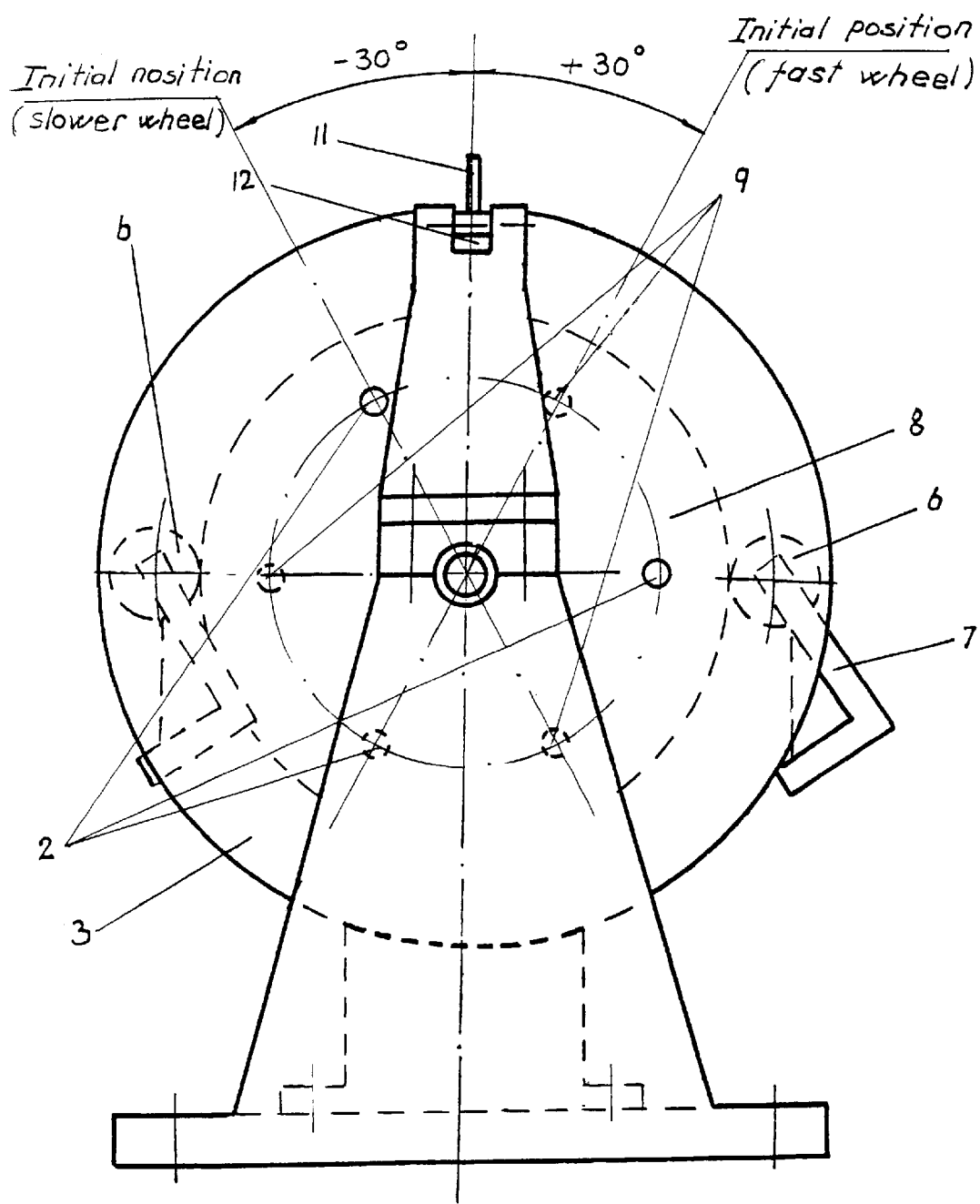
FIG. 1 is a front view of a schematic representation of a system and method of a maintained free rotation by means of interaction between two similar gravitational transducer sub-systems.
Figure 2:
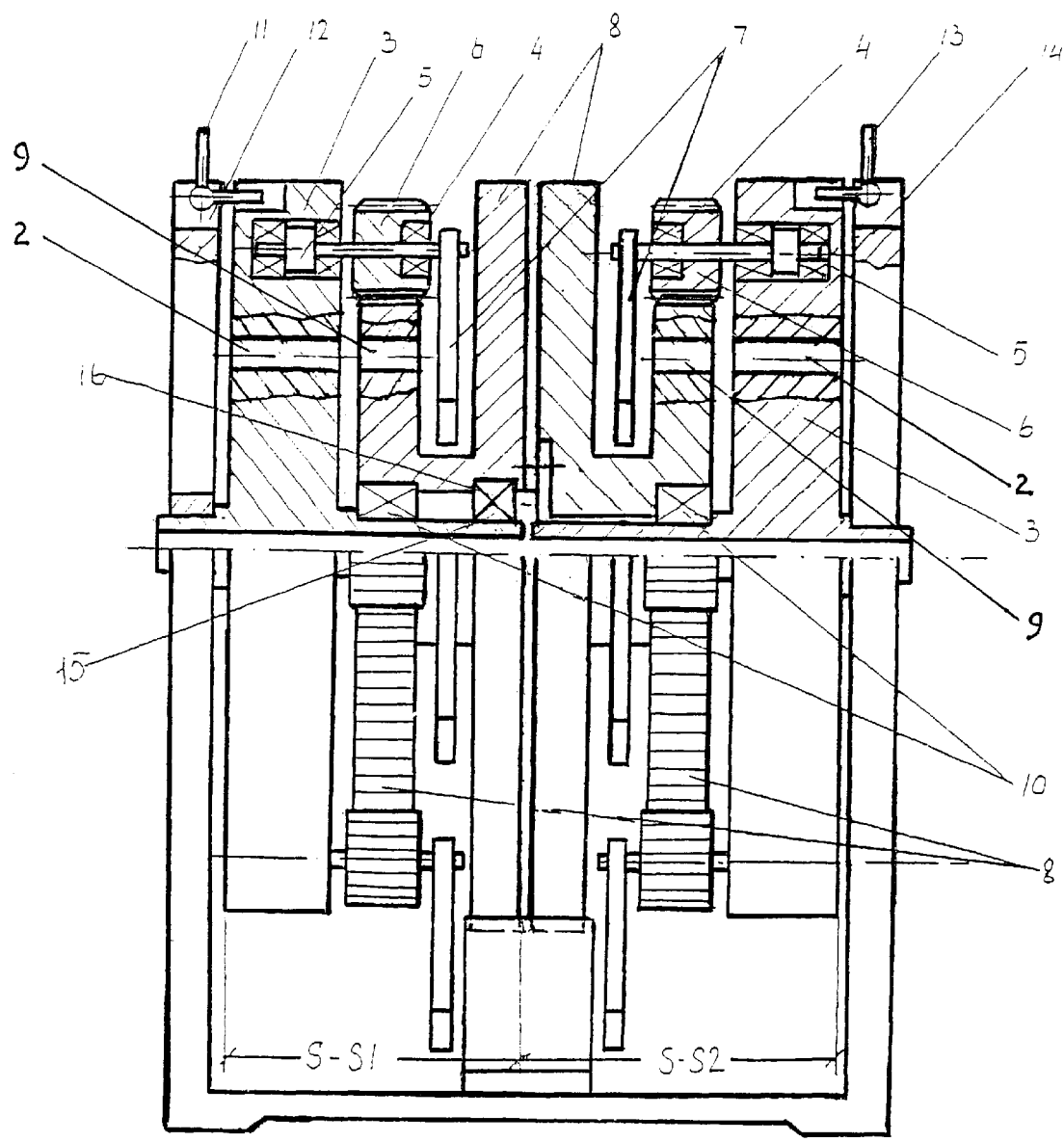
FIG. 2 is a side view of the System shown in FIG. 1.

A system of a maintained free rotation by means of a certain friction interaction between two similar gravitational transducer sub-systems includes two sub-systems S-S1 and S-S2, as seen in FIG. 2.

The first and second sub-system being connected to one another with their wheels 8 by means of an overrunning clutch 16 combined with bearing 15 having directional clutches 10 themselves.

The wheels 8 have a gear periphery. Both sub-systems have the wheel 3 as a support for the gear's 6 mechanism.

Wheel 8 and wheel 3 are connected to one another by means of gears 6 and overrunning clutch 4, spaced equidistantly on a periphery of the wheel 3, having a lever 7 as a local unbalanced mass on each gear. The local unbalanced mass has an axle 5 attached therethrough and connected to each gear 6 by means of overrunning clutch 4. Overrunning clutch 4 contains each lever 7 to each gear 6.

The local unbalanced levers 7, which make wheel 8 turn faster and hence more frequently than wheel 3 are balanced as "systems of levers".

Wheel 8 has a certain kinematic relation to wheel 3 such that during a free rotation of the above wheels from an initial position, wheel 8 is powered by the unbalanced mass 9, by the unbalance mass 2 and by sequential impulses of force that are generated as a result of the constant rotational separation of unbalanced mass 2 from the unbalanced mass 9. The sequential impulses of force cause the wheel 8 to rotate with increasing speed during approximately two-thirds of its rotational cycle and with decreasing speed during approximately one third of its rotational cycle.

And wheel 3 is being powered by the unbalanced mass 2, by unbalanced mass 9 and also by sequential impulses of force that are generated as a result of a rotation of the local unbalanced masses 7 around their respective axles and as a result of the constant rotational separation of the unbalanced mass 2 from the unbalanced mass 9 by means of gears 6, rotating slower than wheel 8 due to the reacting force of the increasing speed of wheel 8.

First sub-system starts to move after fork lever 13 is disconnected from holder 23 and has released the S-S1 from the initial position.

Figure 3:
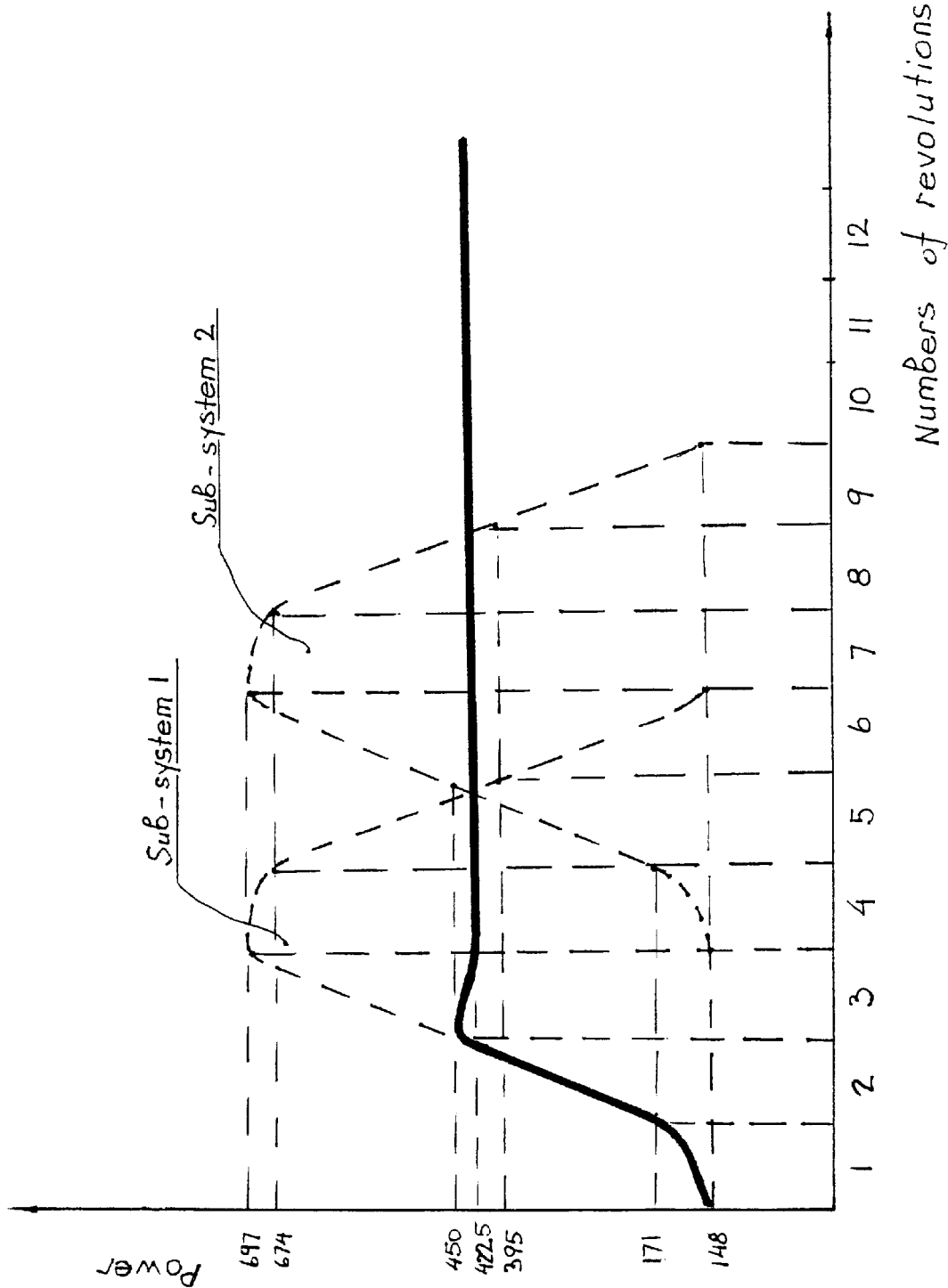
FIG. 3 is a diagram of the interaction between two similar sub-systems.

So that, the first revolution of the second sub-system coincides with the third revolution of the first sub-system, as seen in FIG. 3.

It is proven that each sub-system has a cycle of rotation, and ⅔ of a cycle sub-system runs with an increasing speed and ⅓ of a cycle—with decreasing speed. In our case the working models have a cycle of 6 revolution and four of them are running with increasing speed and 2 of them—with decreasing speed.

On the diagram increasing speed is indicated as "i", and decreasing speed as "d".

The two last revolution "$5d$" and "$6d$" have decreasing speed. But indeed they have decreasing speed only in a dead-zone of rotation (left side). The rotation in the active zone (right side) is always moving with an increasing speed. The working model proof shows that the $5^{th}$ and $6^{th}$ revolutions with decreasing speed are able to overcome the dead-zone and reach the initial position for rotation through a substantial number of cycles.

And here is calculated interaction between two similar sub-systems, which is able to convert gravitational energy into mechanical energy and to operate for a substantial number of rotational cycles and to overcome many cycles of movement.

The first sub-system starts to work (at a time when the second sub-system is not yet working) with increasing speed (velocity) after the handle 11 releases it from the initial position in holder 12. When the second sub-system starts to work friction occurs at the connection between the first and second sub-systems. That connection is by means of overrunning clutch 16 which is combines with bearing 15.

Interactions begin when the second sub-system starts to work after the first one has already made two revolutions with increasing speed at the time when the handle 13 releases the second sub-system from the initial position (holder 14).

By combining the two-systems in a way that the second sub-systems begins after the first sub-system has completed one third of a cycle of rotation at increasing speed, the two sub-systems enhance each other's ability to convert gravitational energy into mechanical energy in a way that keeps the velocity of both sub-systems closer to a constant velocity than would exist for each sub-system operating independently. Indeed for certain periods of time the system and the two sub-systems rotate at substantially constant velocity for significant periods of time. In such a case of interaction between two increasing and one decreasing speeds we have to take into account the fact that increasing speed of one of the sub-systems is opposite to the decreasing speed of other sub-system and they nullify each other.

So that as a result of such interaction, it provides increasing speed during the first two revolution and then maintains it during the third one and increases again during the $4^{th}$ one and then maintains it during the $5^{th}$, $6^{th}$, $7^{th}$ and $8^{th}$ revolutions and then decreases slightly during the $9^{th}$ revolution and increases again during the $10^{th}$ one and maintains it during the $11^{th}$, $12^{th}$, $13^{th}$, $14^{th}$ revolutions and then decreases slightly the $15^{th}$ one.

So that every other combined cycle of rotation maintains what is occurring during the above first two combined cycles of free rotation.

The present invention is very useful since rotational energy is needed for a myriad of applications and since the present invention can be used to convert mechanical energy into rotational energy. Any device in which all or part of the device rotates repeatedly would benefit from the present invention.

It is to be understood that while the method and system of this invention have been described and illustrated in detail, the above-described embodiments are simply illustrative of the principles of the invention. It is to be understood also that various other modifications and changes may be devised by those skilled in the art which will embody the principles of the invention and fall within the spirit and scope thereof. It is not desired to limit the invention to the exact construction and operation shown and described. The spirit and scope of this invention are limited only by the spirit and scope of the following claims.

What is claimed is:

1. A system for enhancing the conversion of gravitation into mechanical energy by means of the interaction of two sub-systems, each of which converts gravity into mechanical energy by means of a sequence of impulses of force, comprising:

a first sub-system and a second sub-system, the first sub-system including a first rotatable element having thereon a first unbalanced mass and a second rotatable element having thereon a second unbalanced mass, in the first sub-system the first element and the second element being connected to one another by means of gears spaced equidistantly on a periphery of the second element and a first overrunning clutch, having a first local unbalanced mass on each gear in the first sub-system, said first local unbalanced mass having an axle attached therethrough and connected to each gear by means of a second overrunning clutch, in the first sub-system the first element having a certain kinematic relation to the second element such that during a free rotation of the first and second elements from an initial position, the first element is powered by the first unbalanced mass, by the second unbalanced mass, and by sequential impulses of force that are generated as a result of a rotation of the first local unbalanced masses around their respective axles and as a result of the constant rotational separation of the second unbalanced mass from the first unbalanced mass, said sequential impulses of force causing said first rotatable element to rotate with increasing speed during approximately two-thirds of a rotational cycle of said first rotatable element and with decreasing speed during approximately one third of the rotational cycle of said first rotatable element, in the first sub-system the second element being powered by the second unbalanced mass, by the first unbalanced mass, by sequential impulses of force that are generated as a result of a rotation of the first local unbalanced masses around their respective axles and as a result of the constant rotational separation of the second unbalanced mass from the first unbalanced mass, and by means of the gears, in the first sub-system said second rotatable element rotating slower than the first rotatable element due to the reacting force of the increased speed of the first rotatable element, the second sub-system including a third rotatable element having thereon a third unbalanced mass and a fourth rotatable element having thereon a fourth unbalanced mass, in the second sub-system the third element and the fourth element being connected to one another by means of gears spaced equidistantly on a periphery of the fourth element and a third overrunning clutch, having a second local unbalanced mass on each gear in the second sub-system, said second local unbalanced mass having an axle attached therethrough and connected to each gear in the second sub-system by means of a fourth overrunning clutch, in the second sub-system the third element having a certain kinematic relation to the fourth element such that during a free rotation of the third and fourth elements from an initial position, the third element is powered by the third unbalanced mass, by the fourth unbalanced mass, and by sequential impulses of force that are generated as a result of a rotation of the second local unbalanced masses around their respective axles and as a result of the constant rotational separation of the fourth unbalanced mass from the third unbalanced mass, said sequential impulses of force causing said third rotatable element to rotate with increasing speed during approximately two-thirds of a rotational cycle of said third rotatable element and with decreasing speed during approximately one third of the rotational cycle of said third rotatable element, in the second sub-system the fourth element being powered by the fourth unbalanced mass, by the third unbalanced mass, by sequential impulses of force that are generated as a result of a rotation of the second local unbalanced masses around their respective axles and as a result of the constant rotational separation of the fourth unbalanced mass from the third unbalanced mass, and by means of the gears in the second sub-system, in the second sub-system said fourth rotatable element rotating slower than the third rotatable element due to the reacting force of the increased speed of the third rotatable element, the first element of the first sub-system and the third element of the second sub-system being connected to one another by means of a fifth overunning clutch that provides sufficient friction between the first element of the first sub-system and the third element of the second sub-system so that movement of the first element causes the third element to move when the second sub-system is released from an initial position, said second sub-system starting to operate and interact with the first sub-system after the first sub-system has already made two revolutions with increasing velocity.

2. The system of claim 1, wherein the first rotatable element and the third rotatable element each is a wheel having thereon gear periphery, wherein the second rotatable element and the fourth rotatable element each is a wheel, wherein the first unbalanced mass is stationary relative to the first rotatable element, the second unbalanced mass is stationary relative to the second rotatable element, the third unbalanced mass is stationary relative to the third rotatable element, the fourth unbalanced mass is stationary relative to the fourth rotatable element and wherein the first and second local unbalanced masses are angled levers.

3. The system of claim 1, wherein the gears in the first sub-system are connected to a gear periphery on the first rotatable element and wherein the gears in the second sub-system are connected to a gear periphery on the third rotatable element.

4. The system of claim 1, wherein during a first cycle of rotation having six revolutions the system velocity stays substantially constant during third revolution, increases during the fourth revolution, stays substantially constant during the fifth, sixth, seventh and eighth revolutions, and wherein during the second cycle of rotation the system velocity decreases slightly during the ninth revolution, increases during the tenth revolution, stays substantially constant during the eleventh, twelfth, thirteenth and fourteenth revolutions and wherein during the third cycle of rotation the system decreases slightly during the fifteenth revolution.

5. A method of enhanced conversion of gravitation into mechanical energy by means of the interaction of two sub-systems each of which converts gravity into mechanical energy using a sequence of impulses of force, comprising the steps of:

placing a first unbalanced mass on a first rotatable element of a first sub-system, placing a second unbalanced mass on a second rotatable element of a first sub-system, connecting the first element and the second element to one another by means of gears, spaced equidistantly on a periphery of the second element, of the first sub-system and by means of a first overrunning clutch of the first sub-system, placing a first local unbalanced mass on each gear of the first sub-system, said first local unbalanced mass having an axle attached therethrough and connected to each gear by means of a second overrunning clutch, freely rotating the first and second elements from an initial position so that the first element is powered by the first unbalanced mass, by the second unbalanced mass, and by sequential impulses of force that are generated as a result of a rotation of the first local unbalanced masses around their respective axles in the first sub-system and as a result of the constant rotational separation of the second unbalanced mass from the first unbalanced mass, said sequential impulses of force causing said first rotatable element to rotate with increasing speed during approximately two-thirds of a rotational cycle of said first rotatable element and with decreasing speed during approximately one third of the rotational cycle of said first rotatable element, so that the second element is powered by the second unbalanced mass, by the first unbalanced mass, by sequential impulses of force that are generated as a result of a rotation of the first local unbalanced masses around their respective axles in the first sub-system and as a result of the constant rotational separation of the second unbalanced mass from the first unbalanced mass, and by means of the gears in the first sub-system, when the first sub-system is not connected to the second sub-system, and so that the second element rotates slower than the first element due to the reacting force of the increased speed of the first element, placing a third unbalanced mass on a third rotatable element of a second sub-system, placing a fourth unbalanced mass on a fourth rotatable element of a second sub-system, connecting the third element and the fourth element to one another by means of gears spaced equidistantly on a periphery of the fourth element and a third overrunning clutch, placing a second local unbalanced mass on each gear of the second sub-system, said second local unbalanced mass having an axle attached therethrough and connected to each gear by means of a fourth overrunning clutch, freely rotating the third and fourth elements from an initial position so that the third element is powered by the third unbalanced mass, by the fourth unbalanced mass, and by sequential impulses of force that are generated as a result of a rotation of the second local unbalanced masses in the second sub-system around their respective axles and as a result of the constant rotational separation of the fourth unbalanced mass from the third unbalanced mass, said sequential impulses of force causing said third rotatable element to rotate with increasing speed during approximately two-thirds of a rotational cycle of said third rotatable element and with decreasing speed during approximately one third of the rotational cycle of said third rotatable element, so that the fourth element is powered by the fourth unbalanced mass, by the third unbalanced mass, by sequential impulses of force that are generated as a result of a rotation of the second local unbalanced masses around their respective axles in the second sub-system and as a result of the constant rotational separation of the fourth unbalanced mass from the third unbalanced mass, and by means of the gears in the second sub-system when the second sub-system is not connected to the first sub-system, and so that the fourth element rotates slower than the third element due to the reacting force of the increased speed of the third element, connecting the first element of the first sub-system and the third element of the second sub-system by means of a fifth overrunning clutch that provides sufficient friction between the first and third elements so that movement of the first element causes the third element to move when the second sub-system is released from an initial position, starting the second sub-system to operate and interact with the first sub-system after a duration of one-third of the rotational cycle of the first rotational element.

6. The method of claim 5, wherein during a rotational cycle of the first rotational element measured from when the first and second sub-systems operate simultaneously, an increase or decrease in the velocity of the first sub-system is counteracted by a decrease or increase in the velocity of the second sub-system.

7. The method of claim 5, wherein during a rotational cycle of the first rotational element measured from when the first and second sub-systems operate simultaneously, an increase or decrease in the velocity of the first sub-system is counteracted by a decrease of increase in the velocity of the second sub-system and wherein a second rotational cycle, a third rotational cycle and a fourth rotational cycle of the first rotational element are identical to the rotational cycle.

* * * * *